Patented July 8, 1941

2,248,112

UNITED STATES PATENT OFFICE 2,248,112

ACYLATION OF ORGANIC COMPOUNDS

Clarence August Neustein, Los Angeles, Calif., assignor to Miller Chemical Works, Incorporated, Los Angeles, Calif., a corporation of California No Drawing. Application December 10, 1938, Serial No. 245,015

19 Claims. (Cl. 260—474)

The present invention pertains to methods of conducting reactions involving the introduction or substitution of acyl radicals into organic compounds, this type of reaction being generally known as acylation. Although acylation as a general typical process of organic chemistry has been utilized in the past for the introduction of acyl radicals or groups into aromatic and heterocyclic compounds, the present invention is particularly directed toward novel steps and conditions of treatment whereby an acyl radical may be introduced into a hydroxy group with much greater facility and with concomitantly larger yields than has been possible in the past.

The term "acylation" as used herein shall refer to those processes in which an acyl radical or group is introduced or substituted for the hydrogen in a hydroxy group and the term "acyl radical or group" shall be used herein so as to include the general group

and other active or substitute group, the term, as used herein, thereby including the usual groups, such as CH3CO or C6H5CO, R referring to any desired chain, cyclic or heterocylic compound.

It has been discovered that by carrying out acylation in the presence of an anhydrous inert solvent which preferably is capable of dissolving the starting materials or compounds but which will not exert an appreciable solvent effect upon the acylated product, extraordinarily large yields can be obtained and the products made are of exceptional purity and in most instances need not be further purified by recrystallization or the like.

The invention is further based upon the discovery that anhydrous solvents exert a solvent effect upon materials and chemical compounds which are vastly different from the solvent properties ordinarily attributed to such solvents in their usual so-called pure condition. It has been found, for example, that the presence of more than 0.05% of moisture in benzol renders the benzol an active solvent for acetylsalicylic acid and for salicylic acid, and commercially pure benzol generally contains more than 0.05% of water. Anhydrous benzol, i. e., benzol which does not contain more than about 0.01% of water, will act as a solvent for these two specific substances only at high temperatures such as, for example, 50° C. but at low temperatures, such as those slightly above the freezing point of benzol, the anhydrous benzol will dissolve salicylic acid but will not exert as marked a solvent effect upon acetylsalicylic acid, thereby permitting the ready separation of salicylic acid from acetylsalicylic acid.

The solubility characteristics of other organic solvents are very greatly influenced by minute quantities of water and the use of anhydrous solvents thereby permits ready separation of materials and products due to differences in solubility. The terms "anhydrous solvents" and "anhydrous conditions" as used herein will therefore refer to solvents and materials in the reaction mixture or solution which do not contain more than about 0.05% water, the total amount of water present in the system being preferably on the order of 0.01% or therebelow.

The invention is also directed to the use of solvents or liquid media which have a boiling point within an effective reaction temperature range of the reaction being conducted. It has been found that by the use of liquid media or solvents which are anhydrous and which have a boiling point within the effective or optimum reaction temperature range, the temperature of reaction may be readily controlled. Furthermore, when exothermic reactions are encountered, the temperature is very readily controlled since any heat generated by the reaction is dissipated as latent heat of evaporation of the solvent. Greater homogeneity and uniformity is attained under these preferred conditions. The process of this invention contemplates operation under reflux conditions whereby most effective use is made of the solvent and its boiling point.

The term "solvent" as used herein shall include organic liquid media which preferably dissolve all of the reactants at the temperature of reaction and which are preferably reasonably easy to obtain in an anhydrous state or which are readily converted into the anhydrous state. Benzol, chloroform, petroleum ethers, absolute alcohol, are examples of suitable solvents. The term "solvent" as used herein shall also refer to liquid media which may actively enter into the reaction such as, for example, phenol, but in such instances such solvents should also comply with the requirement that they be anhydrous.

It is an object of this invention, therefore, to disclose and provide a process of acylation of various organic compounds, particularly aromatic and heterocyclic compounds.

A further object of the invention is to disclose and provide a facile method of acylating organic compounds with the production of extraordinarily large yields of product.

Another object is to provide conditions of operation in an acylation process whereby products of high purity may be obtained directly, without the necessity of further purification as by recrystallization or the like.

An object of the present invention is to disclose and provide a process for the introduction of acyl radicals into an hydroxy group of aromatic or heterocyclic compounds under anhydrous conditions.

A still further object is to provide methods whereby an acyl group of the

type or comprising an active hydroxy or active substituted hydroxy group may be introduced into a hydroxy group of an aromatic or heterocyclic compound.

An object of the invention is to disclose improved methods of producing numerous organic compounds such as aspirin, salol, etc., adapted for many uses in medicine and industry both as final products and as intermediates.

For purposes of illustration and example, particular reference will be made to the adaptation of the process to the manufacture of aspirin or acetylsalicylic acid. Heretofore, aspirin has been made by the action of acetylchloride or acetic anhydride on salicylic acid. Salicylic acid of high purity had to be employed and great difficulty was encountered in obtaining a satisfactory yield. Even under the best previously known commercial operations yields of only about 80% were obtained, i. e., the yield of aspirin amounted to only 80% of the weight of the salicylic acid employed.

Furthermore, in such commercial processes of the past large excesses of acetic anhydride or acetylchloride had to be used. Great difficulty was encountered in producing an aspirin which was free from salicylic acid and which conformed to the requirements of the U. S. Pharmacopoeia, such requirements, for example, taking into consideration the melting point, the percentage of acetylsalicylic acid, presence of sulfates, chlorides, carbonizable substances, coloring matter, heavy metals, etc. In view of the difficulties of commercial manufacture, the U. S. Pharmacopoeia required that the assay of the product show the presence of only 99.5% acetylsalicylic acid and the melting point of the material was deemed satisfactory if it was determined to be 135° C. or higher.

The advantages accruing from the use of the process of this invention will be readily appreciated from the fact that yields of 110% to 120% are commonly obtained and that the first precipitation or first crop of crystals generally comprises a yield of about 100%. Furthermore, these high yields are obtained without the necessity of using the time-consuming and expensive recrystallization and purification steps of the prior art. The aspirin produced in accordance with this invention will ordinarily assay between 99.6% and 100.0% acetylsalicylic acid. The melting point of the product of this invention is well in excess of 135° C. and is generally about 138° C., this high melting point again indicating the high purity of the product.

The aspirin produced in accordance with the process of this invention is also distinguishable from aspirins produced by previously known methods in that such aspirin may be precipitated or produced either in the form of a free powder (of such purity as to exhibit electrostatic characteristics to chromium) or in the form of large crystals which may individually measure up to about one-fourth inch in length. Furthermore, the crystals found in the product are substantially of but a single type and exhibit a triclinic crystal structure in major proportion.

The following example illustrates the operation of the process as applied to the manufacture of aspirin:

1 kilogram of salicylic acid and 936 grams of acetic anhydride were added to 1250 cc. of anhydrous benzol. The distillation range of the benzol was less than 1° C. The salicylic acid and acetic anhydride were anhydrous so that the total moisture content of all of the ingredients was not in excess of 0.01%. These ingredients were then heated under a reflux condenser provided with magnesium perchlorate aspiration tube. The temperature of the solution or reaction liquid was maintained at its boiling point, 80.2° C., for a period of about eight hours, at which time the reaction mixture did not respond to the test for salicylic acid. It is to be understood that the time of heating may vary from about four hours up, six to eight hours being generally sufficient, the reaction being terminated whenever a test of the reaction mixture indicates that all of the salicylic acid has been acetylated. Attention is further called to the fact that but a slight excess of acetic anhydride was present in the reaction vessel. Ordinarily it is desirable to have a slight excess of say 2% to 5% present. The amount of solvent employed may vary appreciably but should be sufficient to dissolve all of the ingredients at the boiling point.

After the reaction has been completed, the reaction mixture is preferably filtered, while still hot, (to remove artifacts and solid impurities) and the filtrate then subjected to cooling or chilling, preferably with accompanying agitation, in order to precipitate the aspirin. Although precipitation of aspirin will take place at temperatures as high as 30° C., it is preferable to chill the reaction liquid to temperatures on the order of about —10° C. in order to complete the precipitation. Regulation of the temperature of the mother liquor during precipitation will permit regulation of the size and physical character of the precipitated aspirin.

The mother liquor is then removed from the precipitated aspirin and the aspirin is preferably washed with anhydrous benzol or other organic solvent while at a low temperature, say temperatures of from about +5° C. to —10° C. The washed aspirin is then preferably dried under vacuum. The crop thus collected will in most instances represent a yield of about 100%. When the specified quantities of the example were employed, 1078 grams of aspirin, representing a yield of 108%, were obtained.

The residual mother liquor together with the washings may now be subjected to vacuum distillation for the removal of the benzol, such distillation being continued until the residue is in the form of a thick slurry or a moist cake. This residue is then redissolved in fresh anhydrous benzol by the aid of heat, then filtered, and the filtrate again chilled to precipitate additional quantities of aspirin. The precipitated aspirin may be then handled as described hereinabove for the first crop. Treatment of residual mother liquor may be repeated if desired, but is usually unnecessary. Although in the above example the reaction mixture was maintained at its boiling point during the reaction, temperatures of between 50° C. and 120° C. may be employed. The preferred range, however, is between about 75° C. and 85° C. and in the event reflux conditions are employed, it will be found that the temperature will normally fall within this preferred range.

Attention is called to the fact that in the above process it is not necessary to employ highly purified or refined salicylic acid and that technical grades may be used with economic advantage. Products of high purity may be obtained from such technical grades and comparison of the specifications for acetylsalicylic acid as set forth in the U. S. Pharmacopoeia with the properties of the product manufactured in accordance with the process herein described shows that aspirin made in accordance with this invention exceeds in purity all of the specifications. For example, the U. S. Pharmacopoeia states that acetylsalicylic acid when dried to constant weight shall contain not less than 99.5% of acetylsalicylic acid; the product made in accordance with this invention contains not less than 99.7% acetylsalicylic acid. The present process produces an aspirin containing not more than 0.002% ash whereas U. S. Pharmacopoeia requires an ash content of not more than about 0.05%. The color of a solution produced by dissolving 0.5 gram of acetylsalicylic acid should have no more color than matching fluid Q whereas the product of this invention similarly tested has less color than matching fluid P. In testing for chlorides and sulfates in accordance with the prescribed methods, no turbidity is noticed even though 5 grams of acetylsalicylic acid are used instead of the specified 1 gram. The U. S. P. test for heavy metals, based on a 1 gram sample, is readily met and as a matter of fact, the product of this invention gives no test for heavy metals by any quantitative test for the detection of minute traces of metals. The product made in accordance with this invention is remarkably free from free salicylic acid; the standard procedure refers to the use of a solution made by dissolving 0.1 gram in specified quantities of alcohol and water but no trace of salicylic acid is obtained even though a saturated solution is employed instead of the 0.1 gram specified in the standard method of testing.

The acetylsalicylic acid made as described herein is not only distinguishable by its exceedingly high purity but is also distinguishable by the relatively large crystal structure which can be developed by regulating temperatures during crystallization. Crystals as long as ¼ inch may be readily obtained whereas the only previously known crystals of acetylsalicylic acid were extremely minute and of very small volume. Storage characteristics of the product are excellent.

In another exemplary form of the invention, a liquid reagent in anhydrous form takes the place of the solvent, such as anhydrous benzol referred to in the preceding example. When salol is being manufactured, salicylic acid may be added directly to phenol and the solution then heated to a reaction temperature, the phenol acting as both the reactant and the solvent. In this manner the salicylic acid (representing an acyl radical) is introduced into and substituted for the hydrogen of the hydroxy group of the phenol. The acylation of anhydrous phenol with salicylic acid can take place at temperatures between about 150° C. and 200° C. and preferably between about 175° C. and 190° C.

In a specific example of a reaction of this last-mentioned type, 1380 grams of salicylic acid and 511 grams of phosphorous oxychloride were added to 941 grams of anhydrous phenol and the mixture melted and heated under reflux conditions for a period of about six hours, the temperature being about 182° C. The reaction mixture was anhydrous, the total water content being less than 0.05% by weight and actually about 0.02%. Usual precautions to maintain the system dry were taken. During reaction, salicyl-chloride is transitorily formed and hydrogen chloride is liberated. The reaction mixture was then cooled, filtered, and solids washed with water to remove all phosphoric acid, and then dried under vacuum. The resulting product, salol, (phenylsalicylate) weighed 2130 grams, representing a yield of 154% of the salicylic acid.

Those skilled in organic chemistry will appreciate that the solvent (or organic compound adapted to act as an inert or suitable solvent) selected for use in an acylation process of this invention, can be selected by considering its boiling point and solubility characteristics. When the reaction which it is desired to produce takes place at relatively low temperatures, then the ethers may be first considered, but when higher temperatures are necessary for the reaction, then benzol and higher boiling point solvents occur to mind. The solubility characteristics of anhydrous solvents will have to be determined for many substances since published literature thereon is either non-existent or erroneous, and the solubility characteristics should be kept in mind in making the selection. In some instances catalysts need be used in the reaction mixture to assure sufficiently rapid reaction.

It is to be understood that "solvents" as used herein refers to substances capable of acting in the required manner and having desired characteristics, and even though reference has been made to liquid organic media, certain substances, solid at normal air temperatures, are embraced by the term. Phenol is one such substance and becomes liquid at reaction temperatures.

I claim:

1. A method of making aspirin comprising: acylation of salicylic acid with acetic anhydride in the presence of sufficient organic liquid solvent to dissolve the acid and in the absence of more than 0.05% total water, under conditions conducive to the elimination of moisture at a temperature of between about 50° C. and 120° C. for a time sufficient to cause acetylization of the salicylic acid, said solvent being adapted to dissolve the reactants and having an inappreciable solvent effect upon aspirin at temperatures materially below the temperature of reaction, and then cooling the reaction mixture to precipitate aspirin, and separating the aspirin from the residual reaction liquid.

2. A method of making aspirin comprising: acylation of salicylic acid with acetic anhydride in the presence of sufficient benzol to dissolve the acid, in the absence of more than 0.05% total water and under reflux conditions, at a temperature of between about 75° C. and 85° C. for a period of time sufficient to cause acetylization of the salicylic acid; cooling the reaction mixture to precipitate aspirin, and separating the aspirin from the residual reaction liquid.

3. A method of making aspirin comprising: acylation of salicylic acid with acetic anhydride in the presence of sufficient benzol to dissolve the acid, in the absence of more than 0.05% total water and under reflux conditions, at a temperature of between about 75° C. and 85° C. for a period of time sufficient to cause acetylization of the salicylic acid; filtering the hot reaction liquid, cooling the filtrate to precipitate aspirin, separating the aspirin from the residual reaction liquid, and washing the aspirin with anhydrous benzol at temperatures below about 15° C.

4. A method of making aspirin comprising: acylation of salicylic acid with acetic anhydride in the presence of an inert organic solvent and in the absence of more than 0.01% total water, under conditions conducive to the elimination of moisture, and for a time and at a temperature sufficient to cause acetylization of the salicylic acid, said solvent being adapted to dissolve the reactants and having an inappreciable solvent effect upon aspirin at temperatures materially below the temperature of reaction; and separating the produced aspirin from the residual reaction liquid.

5. In a method of making salol, the steps of: acylating anhydrous phenol with salicylic acid in the presence of a halogenating agent and in the absence of more than 0.05% total water, under reflux conditions, and then separating the produced phenyl salicylate from the reaction mixture.

6. In a method of making salol, the steps of: acylating anhydrous phenol with salicylic acid in the presence of phosphorous oxychloride and in the absence of more than 0.05% total water, under reflux conditions, and then separating the produced phenyl salicylate from the reaction mixture.

7. A method of making salol which comprises: acylation of anhydrous phenol with salicylic acid in the presence of a halogenating agent and in the absence of more than 0.05% total water for a period of from about two to eight hours at a temperature of between about 150° C. and 200° C., removing generated gaseous products of reaction from the reaction mixture, and separating the produced phenyl salicylate from the reaction mixture.

8. A method of making salol which comprises: acylation of anhydrous phenol with salicylic acid in the presence of phosphorous oxychloride and in the absence of more than 0.01% total water, at a temperature of between about 175° C. and 190° C. for a period of from about two to eight hours, and then separating the produced phenyl salicylate from the reaction mixture.

9. A process of the acylation type whereby an acyl radical may be introduced in an hydroxy group of an aromatic and heterocyclic compound, comprising: reacting a compound containing an hydroxy group, such compound being from the group consisting of compounds of the aromatic and heterocyclic type, with a substance containing an acyl radical from the group consisting of the

type, where R is any desired compound from the group consisting of chain, cyclic and heterocyclic compounds, in the presence of less than 0.05% of water and in the presence of a liquid organic solvent adapted to dissolve said compound and substance and having a reduced solvent effect on the products of the reaction.

10. A process of the acylation type whereby an acyl radical may be introduced into an hydroxy group of an aromatic and heterocyclic compound, comprising: reacting a compound containing an hydroxy group, such compound being from the group consisting of compounds of the aromatic and heterocyclic type, with a substance containing an acyl radical from the group consisting of the

type, where R is any desired compound from the group consisting of chain, cyclic or heterocyclic compounds, in the presence of less than 0.05% of water and in the presence of an organic solvent adapted to dissolve said compound and substance, said solvent being adapted to dissolve the reactants but not the product of reaction.

11. A process of the acylation type comprising: reacting a compound containing an hydroxy group, such compound being from the group consisting of compounds of the aromatic and heterocyclic type, with a substance containing an acyl radical from the group consisting of $CH_3CO-$ and $C_6H_5CO-$, in the presence of less than 0.05% of water and in the presence of a liquid organic solvent having a boiling point within an effective reaction temperature range of said process, said solvent being adapted to dissolve the reactants at the temperature of reaction and having an inappreciable solvent effect upon the acylated reaction product at temperatures materially below the reaction temperature.

12. A process of the acylation type comprising: reacting a compound containing an hydroxy group, such compound being from the group consisting of compounds of the aromatic and heterocyclic type, with a substance containing an acyl radical from the group consisting of $CH_3CO-$ and $C_6H_5CO-$, in the presence of less than 0.05% of water and in the presence of a liquid organic solvent having a boiling point within an effective reaction temperature range of said process, and under reflux conditions, said solvent being adapted to dissolve the reactants at the temperature of reaction and having an inappreciable solvent effect upon the acylated reaction product at temperatures materially below the reaction temperature.

13. A method of making aspirin, comprising: acylation of salicylic acid with acetic anhydride in the absence of more than 0.05% total water under conditions conducive to the elimination of moisture, and for a time and at a temperature sufficient to cause acetylation of the salicylic acid; and separating the produced aspirin from the residual reaction liquid.

14. In a process of the acylation type wherein an acyl radical is introduced into an hydroxy group of a ring compound, the steps of: reacting an organic compound containing an hydroxy group, such compound being from the group consisting of aromatic and heterocyclic compounds, with a substance containing an acyl radical from the group consisting of $CH_3CO-$ and $C_6H_5CO-$, in the presence of less than 0.05% of water and in the presence of an organic solvent capable of dissolving the reactants at the temperature of the acylation reaction and having a reduced solvent effect on the acylated product of reaction at temperatures materially below the temperature of reaction.

15. In a process of the acylation type wherein an acyl radical is introduced into an hydroxy group of a ring compound, the steps of: reacting an organic compound containing an hydroxy group, such compound being from the group consisting of aromatic and heterocyclic compounds, with a substance containing an acyl radical from the group consisting of $CH_3CO-$ and $C_6H_5CO-$, in the presence of less than 0.01% of water and in the presence of an organic solvent capable of dissolving the reactants at the temperature of the acylation reaction and having a reduced solvent effect on the acylated product of reaction at temperatures materially below the temperature of reaction.

16. In a process of the acylation type wherein an acyl radical is introduced into an hydroxy group of a ring compound, the steps of: reacting an organic compound containing an hydroxy group, such compound being from the group consisting of aromatic and heterocyclic compounds, with a substance containing an acyl radical from the group consisting of $CH_3CO-$ and $C_6H_5CO-$, in the presence of less than 0.05% of water, under reflux conditions, and in the presence of an organic solvent capable of dissolving the reactants at the temperature of the acylation reaction and having a reduced solvent effect on the acylated product of reaction at temperatures materially below the temperature of reaction, said solvent having a boiling point within an effective reaction temperature range.

17. A method of manufacturing aspirin which comprises: reacting salicylic acid with acetic anhydride in the presence of benzol and in the absence of more than 0.05% total water, for a time sufficient to cause acetylization of the salicylic acid; filtering the hot reaction liquid, cooling the filtrate to below 30° C. to precipitate aspirin, separating the aspirin from the residual reaction liquid, washing the aspirin with anhydrous benzol at a temperature of about 5° C. and therebelow, and drying the washed aspirin under vacuum.

18. A method of manufacturing aspirin which comprises: reacting salicylic acid with acetic anhydride in the presence of benzol and in the absence of more than 0.05% total water, for a time sufficient to cause acetylization of the salicylic acid; filtering the hot reaction liquid, cooling the filtrate to below 30° C. to precipitate aspirin, separating the aspirin from the residual reaction liquid, washing the aspirin with anhydrous benzol at a temperature of about 5° C. and therebelow, and drying the washed aspirin under vacuum; removing benzol from residual reaction liquid by vacuum distillation, dissolving the distillation residue in benzol, filtering the solution, and cooling the filtrate to precipitate additional aspirin therefrom.

19. In the manufacture of aspirin by acylation of salicylic acid, the step of washing precipitated aspirin with benzol containing not more than 0.05% of water.

CLARENCE AUGUST NEUSTEIN.